Aug. 12, 1947.    H. G. SCHWARZ    2,425,689
TREATMENT OF FRUIT AND VEGETABLE JUICES
Original Filed Feb. 16, 1940    4 Sheets-Sheet 1
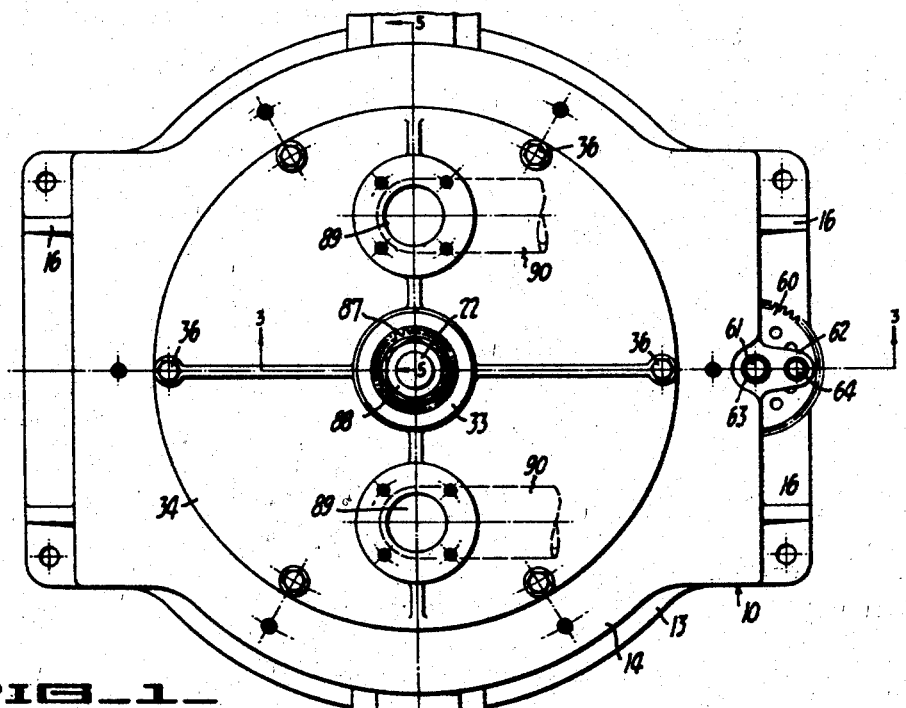
FIG_1_
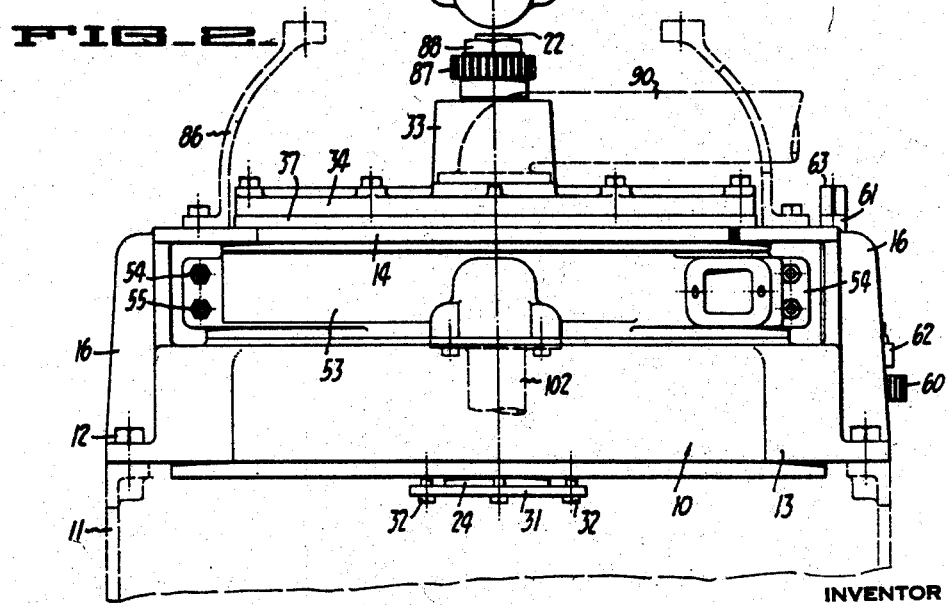
FIG_2_
INVENTOR
Henry G. Schwarz
BY
ATTORNEY

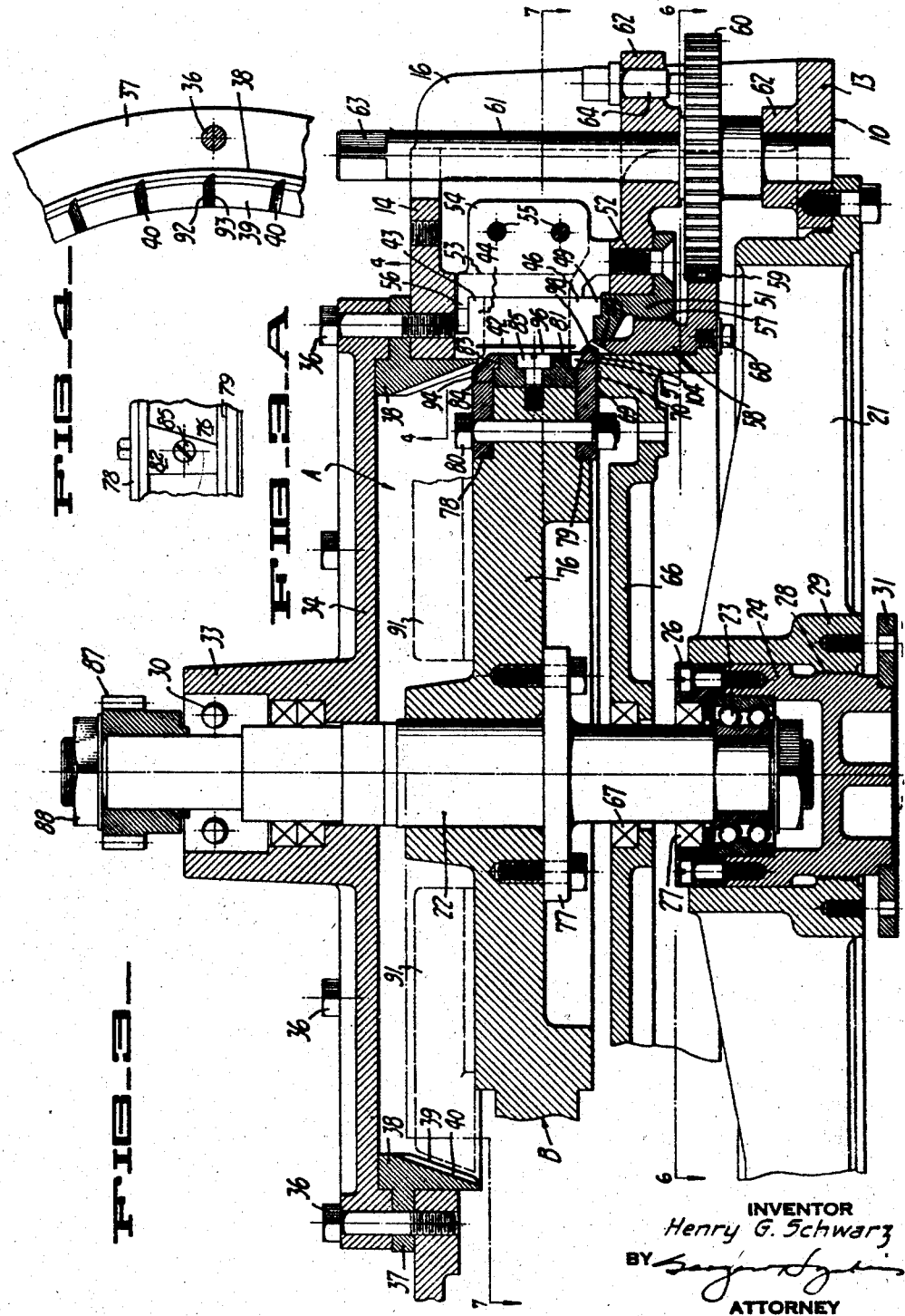

Aug. 12, 1947. H. G. SCHWARZ 2,425,689
TREATMENT OF FRUIT AND VEGETABLE JUICES
Original Filed Feb. 16, 1940 4 Sheets-Sheet 3

INVENTOR
Henry G. Schwarz
BY
ATTORNEY

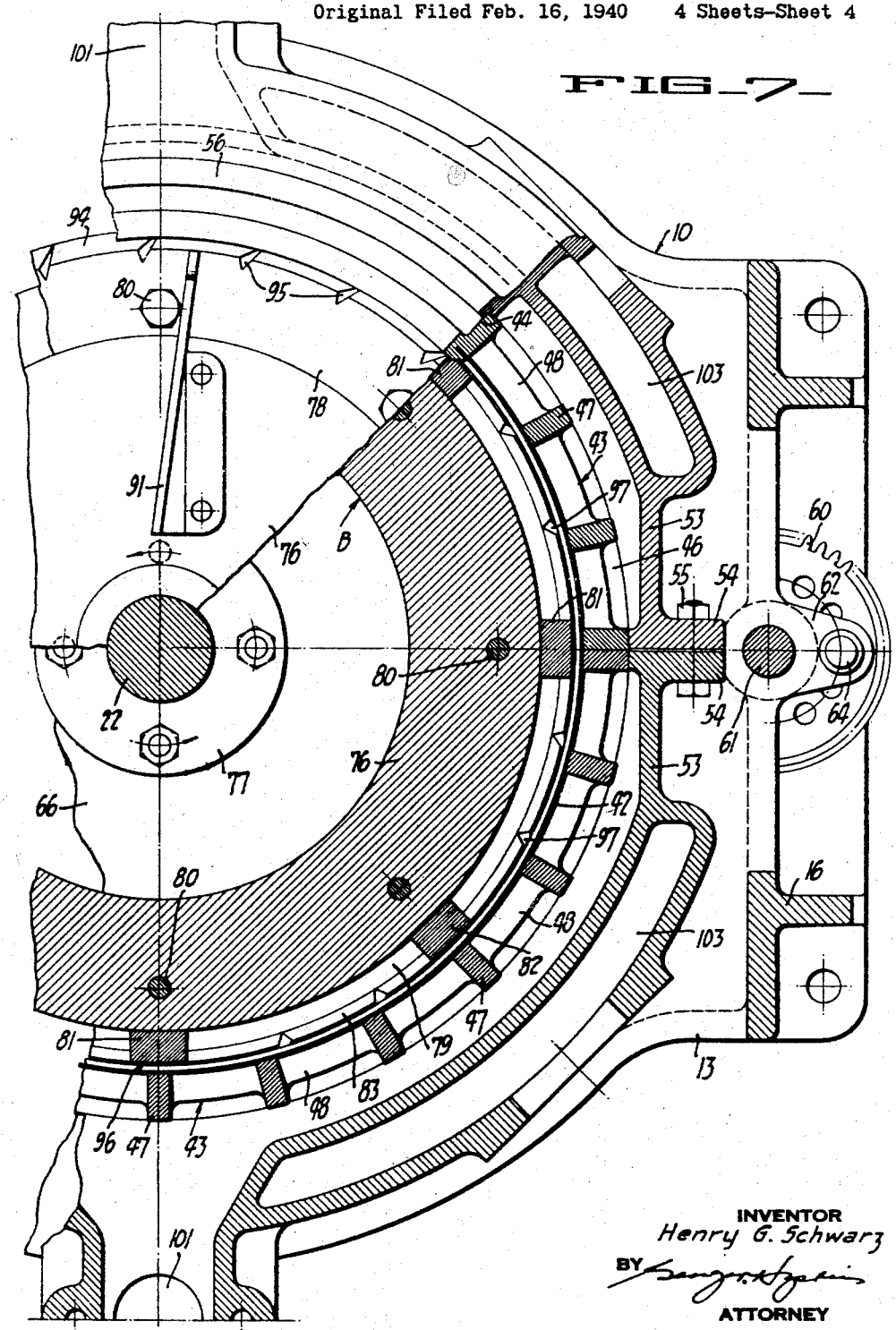

Patented Aug. 12, 1947

2,425,689

UNITED STATES PATENT OFFICE 2,425,689

TREATMENT OF FRUIT AND VEGETABLE JUICES

Henry G. Schwarz, Denver, Colo., assignor to The Schwarz Engineering Company, Inc., San Francisco, Calif., a corporation of Nevada Original application February 16, 1940, Serial No. 319,292. Divided and this application June 9, 1943, Serial No. 490,393

8 Claims. (Cl. 99—105)

1

This invention relates to liquid treating method of a character adapted for homogenizing, blending, dispersing, and filtering operations. In general the method is adapted for use where the finely divided solid contents or heavier liquid constituents of liquid material can be treated to remain in suspension, to be placed in solution or be filtered therefrom to a desired extent. More particularly the invention is concerned with an improved method of the character referred to wherein the liquid material to be treated is subjected to a centrifugal screening effect.

The instant invention has for its general object the provision of improved liquid treating methods adapted to condition liquids with reference to the finely divided solids or heavier liquid constituents contained therein.

This application is a division of my co-pending application Serial No. 319,292, filed February 16, 1940, for Liquid treating apparatus and method, now Patent No. 2,340,990, issued February 8, 1944, and in which patent an apparatus for carrying out the method is claimed.

Other objects and advantages will be apparent from the following description of an apparatus capable of carrying out the method of my invention.

In the drawings:

Figure 1 is a plan view of the apparatus with the motor and the motor support omitted.

Figure 2 is a side elevational view of the apparatus shown in Figure 1 with certain parts indicated schematically Figure 3 is a vertical sectional elevation taken in a plane indicated by the line 3—3 in Figure 1.

Figure 3A is a detail view.

Figure 4 is a detailed enlarged view of one of the liquid controlling and directing surfaces of the treating chamber.

Figure 7 is a horizontal sectional view taken in a plane indicated by the line 7—7 in Figure 3.

Figure 5:
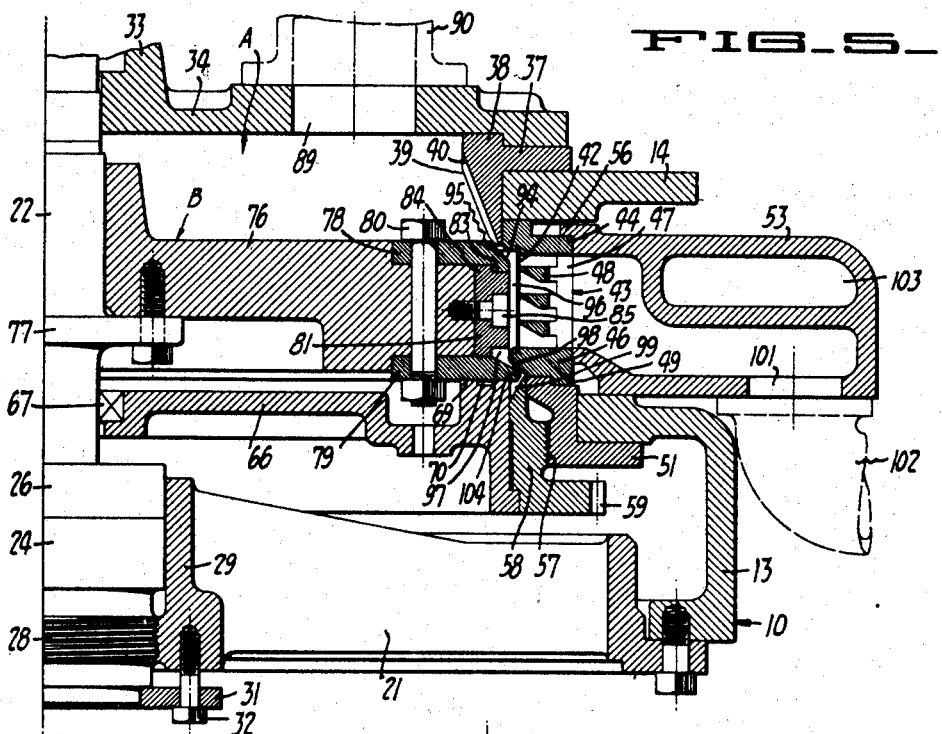
Figure 5 is a fragmentary sectional view taken at right angles to the plane of Figure 3 as indicated by the line 5—5 in Figure 1. The shaft and bearing cage are shown in elevation.

Generally the liquid treating apparatus includes the provision of a treating chamber indicated generally at A into which the material is fed and having its outlet formed by an annular screen forming a part of the outer wall of the chamber and preferably providing the sole discharge means from the chamber and the outlet thereof by centrifugal force. For the latter purpose a rotor B is provided which serves to feed the material outwardly against the screen, to carry the material around against the screen, and to keep such material in a turbulent condition during the time it is being fed to and forced through the screen.

Referring to Figures 1, 2, and 3, the apparatus includes a frame casting 10 which may be mounted upon a base or stand 11 by means of fastening studs 12. The casting 10 is generally circular in form and includes a base portion 13 in the form of a ring and an upper ring portion 14 which is supported in spaced relation from the lower ring 13 by means of a plurality of uprights 16.

As seen in Figures 3 and 5, the lower ring 13 of the frame casting has mounted thereon a supporting spider 21 for an upright drive shaft 22, which has its lower end journalled in thrust bearing 23. Bearing 23 is mounted in bearing cage 24 and held therein by retainer ring 26, which also provides a mounting for seal 27. Bearing cage 24 has threaded connection at 28 within central boss 29 of spider 21 to provide an adjustment for the bearing 23, and may be held in a selected adjusted position by means of a lock ring 31 suitably connected to boss 29 as by studs 32. Adjacent its upper end, shaft 22 is journaled by bearing 30 in an upright boss 33 of a cover 34 secured by studs 36 on top ring 14 of the frame casting with flange 37 of a ring 38 interposed. Ring 38 is provided with an internal frusto-conical surface 39 having liquid impelling and directing means in the form of spaced grooves 40 (Figs. 3 and 4) formed therein as referred to hereinafter.

Between the ring portions 13 and 14 of the frame casting, a screen 42 is mounted in a screen frame, and preferably, the screen and the screen frame are made in two similar semi-circular sections which are suitably held together and in place in a manner later described. As seen in Figures 5 and 7, each screen frame section 43 has upper and lower ring portions 44 and 46 which are joined by circumferentially spaced vertical ribs 47, the vertical ribs themselves being in turn joined by horizontally extending ribs 48 which are tapered at their inner edges to engage and support the screen 42. The spacing of horizontal ribs 48 provides annular discharge slots for liquid materials passing through the screen. The edges of the screen are received in machined grooves in the opposed faces of upper and lower ring portions 44 and 46, the screen being slid endwise into the grooves during assembly. As seen in Figure 5, the lower ring portion 46 of the screen frame has a depending flange 49 engaging a complemental seat in ring 51 (Figs. 3 and 5) which may be suitably secured as by studs 52 to lower ring portion 13 of the frame casting.

Each frame section 43 of the screen assembly is held in place by a semi-circular outlet conduit 53, the two housings 53 being similar and having abutting end flanges 54 secured together as by bolts 55 (Fig. 7). As seen in Figs. 3, 5, and 7, each outlet conduit is provided with an inwardly projecting flange 56 at its upper end overlapping top ring portion 44 of the screen frame, while the lower wall of the conduit 53 (Fig. 5) rests on lower ring part 13 of the frame and has its edge in flush abutting relation to lower ring 46 of the screen frame. When the two conduits 53 are bolted together about the screen frame sections 43, the screen frame sections are held securely in place.

Figure 6:
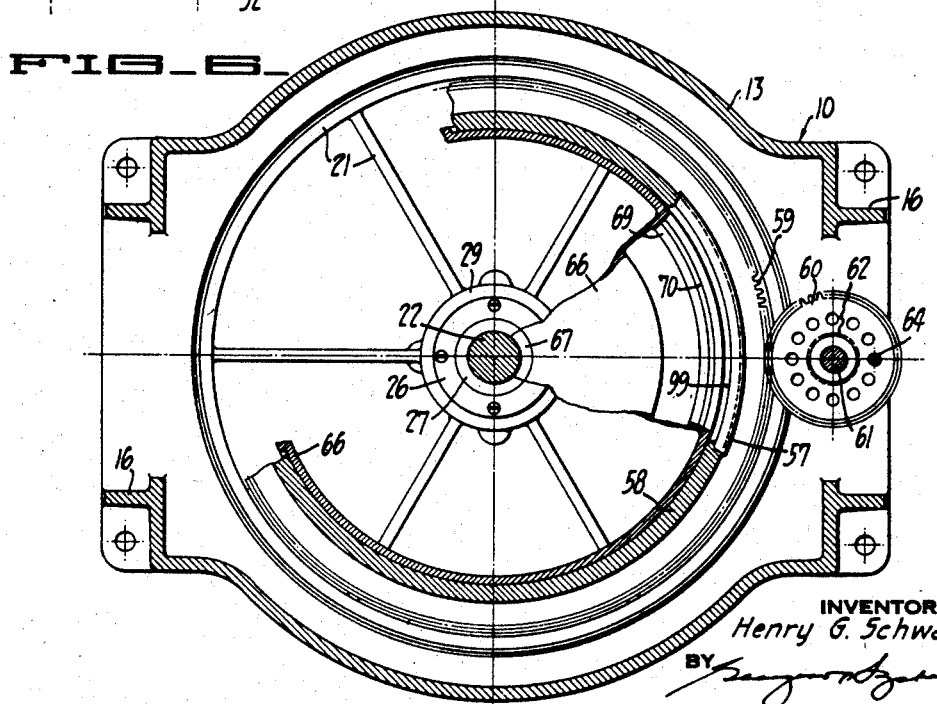
Figure 6 is a horizontal sectional view with certain parts broken away to illustrate details of construction, the view being indicated by the line 6—6 in Figure 3.

The ring 51 (Figs. 3, 5, and 6) is threaded as at 57 to receive a throat ring 58 having peripheral gear teeth 59 on a lower flange thereof for engagement with an adjusting gear wheel 60 secured on a shaft 61 journaled in spaced bosses 62 of the frame casting and having a handle 63 at its upper end. The gear 60 (Fig. 6) is also provided with a series of apertures for engagement by a locking pin 64 carried by upper boss 62 (Fig. 3). The function of the adjustment of the throat member 58 will be referred to hereinafter. To close the bottom of the chamber A, plate 66 is provided, having sealed engagement at 67 with the shaft 22 (Fig. 3) and releasably secured to throat ring 58 as by stud and washer means 68. At its outer edge plate 66 has a raised face 69 provided with a central annular groove 70. Face 69 of ring 66 is placed in flush sealing engagement with the bottom face of rotor B by vertical adjustment of throat ring 58.

The centrifugal feeding rotor B is provided in the form of a disc 76 suitably secured on a flange 77 of shaft 22 and having its outer edge reduced to receive upper and lower retaining rings 78 and 79 secured thereon by bolts 80. The retaining rings 78 and 79 serve to clamp a plurality of impellers 81 and 82 about the periphery of the rotor B. For this purpose, the rings 78 and 79 have opposed flanges 83 to engage over end flanges 84 of the impellers. Impellers 81 and 82 are also secured to disc 76 and located with respect thereto by countersunk studs 85. Impellers 81 have straight sides, while the impellers 82 which in the embodiment shown comprise two diametrically opposed similar paddles have their leading edges slightly inclined, say about 15°, as shown in Fig. 3A, to the vertical to force material downwardly.

To provide a drive for the apparatus a suitable motor support 86 (Fig. 2) may be secured on top of the frame casting to support a motor (not shown) having a coupling for engagement with the drive coupling 87 at the upper end of drive shaft 22. The motor employed should be capable of rotating the shaft at a high rate of speed in a counter-clockwise direction, as viewed in Figures 6 and 7, say in the neighborhood of 3600 R. P. M. Drive coupling 87 may be secured in place by fastening nut 88 having a right-hand threaded engagement with shaft 22 so that the counter-clockwise rotation tends to tighten the nut in the shaft.

To feed material into the chamber A the cover 34 may be provided with a pair of feed openings 89 on which feed pipes 90 may be secured as indicated schematically in Fig. 5. One or both of feed pipes 90 may be employed to feed the liquid material into the treating chamber, or, if desired, one of pipes 90 may be employed to introduce a treating medium. In accordance with my method, an inert gas such as nitrogen may be introduced to exclude oxygen from the treating chamber. Because of the substantially flat upper surface of rotor B and the constricted space between the rotor and ring 38, a liquid seal is formed which will maintain a gaseous agent such as nitrogen in the upper portion of the chamber without loss through the screens.

To throw material outwardly of the chamber A above the rotor B, said rotor may be equipped with a series of angularly disposed impellers 91 (Figs. 3 and 7) whose outer edges trail slightly with respect to a radial line so that material impinging thereagainst will be thrown outwardly toward conical surface 39 of the ring 38. As seen in Figures 3 and 7, impellers 91 have their outer ends spaced closely with reference to surface 39 and have a complemental taper. Grooves 40 of conical wall 39 are formed with an inclined side wall 92 over which liquid is received and a straight wall 93 forming a tooth against which the liquid impinges to be directed downwardly and outwardly in accordance with the conical slant of surface 39. Closely adjacent the beveled lower edge of surface 39 upper clamping ring 78 of rotor B is provided with an opposed conical surface 94 having grooves 95 formed therein. Grooves 95 have their trailing edges formed substantially vertically to act as teeth or impellers, and also angularly with respect to a radius line with their outer edges in trailing position. The tooth-like construction of grooves 40 and 95 in the closely spaced apart surfaces 39 and 94 may be utilized also for a comminuting action, if desired, and this action may be controlled by the vertical positioning of rotor B as adjusted by gearing cage 24.

From the above description it is seen that material introduced into chamber A will be thrown outwardly by the impellers 91 on the top surface of the rotor B against the conical wall surface 39 to be directed downwardly and outwardly through the narrow annular passage afforded between the conical surface 94 at the outer edge of upper retaining ring 78 of the rotor and the beveled edge of the conical surface 39 opposed thereto. The liquid is then forced downwardly between the rotor B and the screen 42 into the annular space or chamber section indicated at 96 which is completely filled with the liquid.

An important feature of my method is that the liquid is carried around by the rotor B and its impellers 81 and 82 so that it is forced against the screen 42 by centrifugal force as well as by the pressure of the additional liquid in the upper portion of the chamber A which is trying to force its way downwardly between the rotor and the screen. To assist in the rotation of the liquid the lower retaining ring 79 of the rotor is also provided with spaced grooves 97 which provide additional impelling means and are opposed to a smooth conical surface 98 of the lower ring portion 46 of the screen frame, providing a narrow annular passage which is directed downwardly and outwardly and then reversely over the conical surface 99 at the upper end of the throat ring 58. The lower end of the chamber, therefore, is closed by the sealing engagement of the raised face 69 with the lower face of the rotor. The grove 70 in such face tends to collect material than the spacing between the upper opposed surfaces 39 and 94.

When the liquid material is introduced into the chamber A it is thrown outwardly and whirled rapidly by the rotor B to pass downwardly through the narrow restriction at 39, 94 into the annular treating portion 96 of the treating chamber. Within the treating chamber, the liquid is carried about the screen rapidly by the impelling blades 81 and 82 to be impelled against the screen by centrifugal force. A layer of solid constituents of the material tends to build up upon the screen 42 to form a filter bed and the thickness of this layer is controlled by the lateral spacing provided between the impeller blades 81, 82 and the screen 42. By controlling the restriction of the discharge throat by adjustment of the throat ring 58, the rate of discharge of the heavier pulp constituents can be controlled. In this way the heavier solid constituents can be worked downwardly and outwardly past the throat ring 58 while the juice and the lighter solid constituents are forced outwardly through the screen 42 for discharge. The adjustment of the throat opening at the bottom of the annular chamber portion 96 determines the proportion of the discarded solids to the solids forced through the screen with the juice. The solid particles forced through the screen are of a size so that a large proportion will remain in suspension in the juice, so that a stable product is produced.

The filtering portion of the above described operation can be employed with certain types of liquid material to perform a complete filtering operation by opening the throat ring to discharge the desired amount of solid material and providing apertures of the proper size to exclude material which is not desired in the filtered liquid.

In treating many products it is desirable to exclude air so that, if desired, one of the inlet pipes 90 can be used for introduction of an inert gas such as nitrogen, the juice itself being introduced through the other of the intake pipes 90. The juice is introduced in sufficient volume to be distributed throughout the upper portion of the chamber A to form a liquid seal at the restricted space between the opposed surfaces 39 and 94. In this way escape of the inert gas downwardly and outwardly through the screen is precluded. Also, such liquid seal prevents access of air to the liquid being treated, even if an inert gas is not employed, thus minimizing oxidation of the material which might otherwise prove harmful.

Also, one feed pipe 90 may be provided with a vent valve so that the chamber can be completely filled with the liquid material to drive out the air through the valve, which may then be closed. Subsequently, during operation the feeding of liquid material may be controlled to prevent the entry of air with the liquid material.

In some instances it may be desirable to break up lumps or larger particles in which event the teeth of the opposed surfaces 39 and 94 may be employed to break up or masticate the larger particles so that they will be in a proper condition for treatment by the centrifugal screening effect.

For dispersing operations, for example in dissolving or dispersing ground pectin in water, or for blending liquids, the various constituents may be introduced into the rotor with the bottom plate 66 in position to close the bottom of the treating chamber so that all of the material will be forced out through the screen to perform an efficient mixing or blending action.

I claim:

1. In a method of treating liquid materials of the class consisting of fruit and vegetable juices, which comprises continually feeding liquids to be treated to a confined space, subjecting the liquid during feeding thereof to a centrifugal force effect to cause a whirling movement thereof, restricting the flow of liquid into the space to form a liquid seal at the entrance portion of said space, introducing an inert gas into the space above said liquid seal to exclude the presence of oxygen, subjecting the liquid in said space to a centrifugal force effect, and finally subjecting the liquid to a screening effect while the liquid is still influenced by the centrifugal force.

2. In a method of treating liquid materials of the class consisting of fruit and vegetable juices, which comprises continually feeding liquids to be treated to a confined space while excluding the presence of air, subjecting the liquid during feeding thereof to a centrifugal force effect to cause a whirling movement thereof, restricting the flow of liquid at the entrance portion of said space, subjecting the liquid in said space to a centrifugal force effect, and finally subjecting the liquid to a screening effect while the liquid is still influenced by the centrifugal force.

3. In a method of homogenizing liquid materials of the class consisting of fruit and vegetable juices which comprises continuously feeding liquids to be treated to a confined space, subjecting the liquid during feeding thereof to a centrifugal force to cause flow thereof into said space, restricting the flow of liquid into said space to cause and maintain a build-up of liquid at the entrance portion thereof, subjecting the liquid in said space to a centrifugal force greater than said first force, and applying a screening effect to the liquid while subjected to said greater centrifugal force.

4. In a method of treating liquid materials of the class consisting of fruit and vegetable juices, which comprises feeding the liquid material to be treated to a confined space while excluding the presence of air, restricting the flow of liquid at the entrance portion of said space to form a liquid seal at said entrance portion while simultaneously subjecting the liquid to a centrifugal force effect to cooperate in maintaining such liquid seal at said entrance portion, subjecting the liquid in said space to a centrifugal force effect, and finally subjecting the liquid to a screening effect while the liquid is still influenced by the centrifugal force.

5. In a method of treating liquid materials of the class consisting of fruit and vegetable juices, which comprises feeding the material into a confined space for treatment, subjecting the material to centrifugal force while the material is in said space, subjecting the liquid material to a screening effect while under the influence of centrifugal force, and subjecting the liquid material to a centrifugal force effect during feeding thereof to said treatment space to cause it to build up at the top of said treatment space to exclude air from the material under treatment in said space and provide a liquid seal.

6. In a method of treating liquid materials of the class consisting of fruit and vegetable juices, which comprises feeding the material downwardly into a confined space for treatment, subjecting the material to centrifugal force while the material is in said space, subjecting the liqwhich will act as a seal during the relative rotation between the rotor and the face 69.

The screen 42 as shown has its apertures somewhat exaggerated to more clearly bring out its construction. In practice the size of the apertures are selected in accordance with the characteristics of the material to be treated. The material of the screen may be of any suitable non-corrosive material such as stainless steel or acid resistant rubber as may be required for the different operations to be performed.

The apparatus is shown as conditioned for homogenizing, blending or dispersing operations wherein it is desirable to force all of the constituents of the liquid through the screen to be discharged through the outlet conduit 53 which has discharge opening 101 in communication with a suitable discharge pipe 102. If desired a vacuum may be applied to pipe 102 to aid in the discharge of material through the screen. Preferably the outlet conduit 53 is also provided with a second integrally formed passage 103 which extends from end to end thereof for the passage of steam or some other suitable medium where it is desired to control the temperature of the material being treated.

For filtering operations the bottom closure plate 66 may be dropped by removing stud and washer assemblies 68, so that the lower end of the annular chamber portion 96 is open, the size of the opening being controlled by the spacing of the conical surface 99 of the ring 58 with respect to the conical surface 104 on the rotor. By suitably adjusting the ring 58 this spacing can be adjusted so that a desired amount of the solids in the liquid being treated can be gradually fed downwardly and outwardly from the chamber.

In this connection it will be noted that in accordance with my method, a layer of the solids to be filtered from the liquid will be built up on the screen 42 to form a filter bed and that this is maintained at a constant desired thickness by the wiping action of the impellers 81, 82 as they travel around the screen. The thickness of the filter bed may be controlled by selecting the spacing between the outer edges of the impellers 81, 82 and the screen, either by varying the radial dimension of the impellers or the inner radius of the screen or both. Obviously, if desired, all of the impellers may have straight faces as shown at 81 or inclined faces as at 82. If the bottom opening is constricted sufficiently a greater proportion of solids will be forced through the screen in a filtering operation by the continued application of pressure thereto, while if it is open substantially as shown practically all of the solids can be filtered out of liquids.

For homogenizing operation, the apparatus can be adjusted as shown in the drawings with the bottom closure plate 66 in place. A screen 42 is employed having the appropriate size of aperture for the material to be treated. In general, it may be stated that the size aperture required for the liquid product must be selected in accordance with the particular characteristics of the particular product. Generally, the liquid materials such as fruit and vegetable juices wherein the heavier constituents are of a solid character such as pulp or protein particles, a larger size aperture may be employed than for products such as milk where the heavier constituents are of a liquid character. For example, in homogenizing a vegetable material such as carrot juice, a screen having apertures of a diameter in the order of .005 to .006 inch may be employed.

Carrot juice as well as other similar fruit and vegetable juices when extracted and heated to a pasteurizing temperature is subject to coagulation of a considerable proportion of certain of its constituents in particles of sufficient size to cause settling or separating out upon standing to leave a substantially clear liquor. For the homogenizing operation the carrot juice after heating to or above its final coagulation temperature is introduced into the feeding portion of the treating chamber A above the rotor with the rotor rotating at an appropriate speed, for example in the neighborhood of 3600 R. P. M. The juice is picked up by the impellers 91, is given a rotational direction of travel about the chamber, and is carried radially out over the top surface of the rotor to impinge against the conical surface 39 and be directed downwardly through the restricted annular space between the rotor surface 94 and the casing surface 39, so that it is whirled about rapidly and is forced outwardly and downwardly into the annular space 96 between the screen 42 and the rotor. As the coagulated particles pass between the grinding teeth on the rotor and the casing the larger coagulated protein masses will be broken up.

In the treating space 96 the material is picked up by the impellers 81 and 82 and carried rapidly around the screen and at the same time is forced outwardly by centrifugal force against the screen 42 so as to be forced through the apertures therein.

During the rapid rotation of the liquid materials the impingement of the solid constituents against the impelling and directing surfaces as well as the screen apertures tends to break up the larger particles. In passing through the apertures of the screen, the particles are further broken up and reduced in size so that they will remain in suspension in the liquid. The discharged material from the screen is carried out through the respective openings 101 and the discharge pipes 102 to a can filling machine or for other suitable disposition. The resulting carrot juice has a high proportion of nutritive and flavoring constituents, and is of a consistency to keep a large proportion of the solid particles in suspension in the liquid.

It will be understood that with different materials the speed of rotation of rotor B and the size apertures of the screen are selected in accordance with the characteristics of the material to be homogenized, so that breaking up of the larger particles of the heavier constituents of the liquid material occurs.

In treating the liquid materials, a combined homogenizing and filtering action can be provided, so as to obtain a juice containing a desired amount of pulp constituents, while the consistency of the juice is such that the pulp particles will remain in suspension and not settle out upon standing.

To further adjust the machine for filtering out undesired solid constituents, where it is desired to remove a portion of the pulp and perform a filtering operation, the bottom plate 66 may be dropped down to provide a bottom opening in the treating chamber, and the throat ring 58 is adjusted upwardly to provide the desired restriction between the opposed surfaces 99 and 104. The filtering operation can be controlled to remove a desired amount of pulp even where all the pulp constituents are of a size to pass through the screen openings. The spacing between these lower opposed surfaces is usually slightly less uid material to a screening effect while under the influence of centrifugal force, and subjecting the liquid material to a centrifugal force effect during feeding thereof to said space to cause a head of the liquid material above the entrance to said space during the treatment so that a liquid seal is provided which excludes air from the space where the material is being treated.

7. A method of treating material of the class consisting of fruit and vegetable juices which comprises subjecting the material in a confined annular treatment space to centrifugal force, subjecting the material in said space to a screening effect while under the influence of said centrifugal force, providing a restricted entrance passage for the material into said space, and feeding such material to said entrance passage while subjecting it to a centrifugal force effect to cooperate in maintaining a liquid seal of said material adjacent said entrance passage to preclude access of air into the treatment space while the material is being treated.

8. A method of treating material of the class consisting of fruit and vegetable juices which comprises subjecting the material in a confined annular treatment space to centrifugal force, subjecting the material in said space to a screening effect while under the influence of said centrifugal force, providing a restricted entrance passage for the material into said space, feeding such material to said entrance passage while subjecting it to a centrifugal force effect to cooperate in maintaining a liquid seal of said material adjacent said entrance passage to preclude access of air into the space while the material is being treated, and subjecting the material to a comminuting action adjacent said entrance passage.

HENRY G. SCHWARZ.

REFERENCES CITED

The following references are of record in the file of this patent:

UNITED STATES PATENTS

| Number | Name | Date |
| --- | --- | --- |
| 1,999,789 | Schmierer | Apr. 30, 1935 |
| 2,089,043 | Svensjo | Aug. 3, 1937 |
| 2,240,213 | Fromm | Apr. 29, 1941 |
| 1,769,586 | Luense | July 1, 1930 |
| 1,757,197 | Johnson | May 6, 1930 |
| 1,483,742 | Nicol | Feb. 12, 1924 |

FOREIGN PATENTS

| Number | Country | Date |
| --- | --- | --- |
| 842,167 | France | 1939 |